(12) United States Patent
Schmierer

(10) Patent No.: US 7,500,771 B2
(45) Date of Patent: Mar. 10, 2009

(54) LIGHT FOR VEHICLES, PREFERABLY FOR MOTOR VEHICLES

(75) Inventor: Arne Schmierer, Kirchheim (DE)

(73) Assignees: odelo GmbH, Schwaikheim (DE); Visiocorp Patents S.a.r.l., Luxembourg (LU)

(*) Notice: Subject to any disclaimer, the term of this patent is extended or adjusted under 35 U.S.C. 154(b) by 88 days.

(21) Appl. No.: 11/266,818

(22) Filed: Nov. 4, 2005

(65) Prior Publication Data
US 2006/0120097 A1 Jun. 8, 2006

(30) Foreign Application Priority Data
Nov. 13, 2004 (DE) .................... 10 2004 054 822

(51) Int. Cl.
*B60R 1/12* (2006.01)
(52) U.S. Cl. ........................... 362/494; 362/487
(58) Field of Classification Search ........... 362/494, 362/559, 560
See application file for complete search history.

(56) References Cited

U.S. PATENT DOCUMENTS

| | | | |
|---|---|---|---|
| 6,139,171 A * | 10/2000 | Waldmann | 362/494 |
| 6,227,689 B1 * | 5/2001 | Miller | 362/494 |
| 6,325,517 B1 * | 12/2001 | Kuo | 359/838 |
| 6,416,208 B2 * | 7/2002 | Pastrick et al. | 362/494 |
| 6,566,824 B2 * | 5/2003 | Panagotacos et al. | 315/291 |
| 6,811,288 B2 * | 11/2004 | Hutzel | 362/494 |
| 6,926,432 B2 * | 8/2005 | Rodriguez Barros et al. | 362/494 |
| 7,080,913 B2 * | 7/2006 | Henion et al. | 359/864 |
| 7,168,830 B2 * | 1/2007 | Pastrick et al. | 362/494 |
| 7,220,030 B2 * | 5/2007 | Yagi | 362/494 |
| 7,258,471 B2 * | 8/2007 | Rodriguez Barros et al. | 362/494 |
| 2003/0002179 A1 * | 1/2003 | Roberts et al. | 359/838 |
| 2005/0237757 A1 * | 10/2005 | Weng | 362/494 |
| 2006/0291225 A1 * | 12/2006 | Todd et al. | 362/494 |

* cited by examiner

*Primary Examiner*—Anabel M Ton
(74) *Attorney, Agent, or Firm*—Reising Ethington P.C.

(57) ABSTRACT

Light for vehicles, preferably for motor vehicles. The light has a housing having at least a housing front part and a housing rear wall, said housing being provided with at least one lighting source whose rays pass to the outside. In order to design the light such that it can be manufactured easily and economically in any desired conformation, the lighting source is attached to a lighting source carrier whose conformation corresponds at least in part to the inside contour of the light housing. The light is advantageously used for motor vehicles.

40 Claims, 4 Drawing Sheets

LIGHT FOR VEHICLES, PREFERABLY FOR MOTOR VEHICLES

CROSS-REFERENCE TO RELATED APPLICATIONS

This application claims priority to German Patent Application No. 10 2004 054 822.6 filed Nov. 13, 2004.

TECHNICAL FIELD

The invention concerns a light for vehicles, preferably for motor vehicles.

BACKGROUND OF THE INVENTION

Lights for motor vehicles are known in which LEDs sit on a flexible or rigid carrier for lighting source. The flexible carriers for lighting source are advantageously made of a film-like material provided with conductive traces for contacting and positioning the LEDs. Moreover, other electronic components are often arranged on the lighting source carriers in addition to the LEDs.

The installation of such flexible carriers for lighting source in lights is very complicated, since the LEDs must be brought into a precise mounting position. Positioning and retention aids are often necessary in order to be able to bring the carrier for lighting source into the desired mounting position in a simple way; these aids for their part often require considerable installation space, and thus make the light and its manufacture more expensive and complicated. These complicated additional means restrict the freedom of conformation due to the use of complex tools, and thus stand in the way of compact light designs in particular. It is also necessary to consider that the carrier for lighting source with its LEDs must be fixed in place such that the lighting source carrier cannot start to vibrate. In order to avoid these vibrations, additional damping by means of appropriate damping material must often be used in conjunction with the carrier for lighting source. All of these measures are necessary in order for the carrier for lighting source to achieve stability of shape and robustness in operation over its service life.

The object of the invention is to design the light such that it is possible to produce, simply and economically, an especially compact and flat light unit in any desired conformation. This object is attained in accordance with the invention in a light.

SUMMARY OF THE INVENTION

In the inventive light, the carrier for the lighting source is formed such that its conformation corresponds at least in part to the inside contour of the light housing. The carrier for lighting source can advantageously be a flexible, conductive film upon which the lighting source sit. The conductive film can easily be brought into the desired shape adapted to the inside contour of the housing. The conformation is advantageously chosen such that the resulting shape achieves maximum stiffness and inherent stability of the lighting source carrier. During installation of this lighting source carrier, the lighting source, preferably LEDs, are automatically arranged in the light as a result of their predetermined position on the lighting source carrier. In the interior of the light, parts of the lighting source carrier advantageously project into free spaces that correspond to the shape and dimensions of the lighting source carrier and are formed by housing parts of the light. The lighting source carrier can be clamped in a precise position in these free spaces, and thus fixed in place. This clamping of the lighting source carrier largely prevents the lighting source and the lighting source carrier from being able to enter into destructive vibrational states. The precise positioning and fixing in place is advantageously fostered in that recesses for accommodating the lighting source are provided in the interior of the light. By this means, it is possible to build especially space-saving and compact lights that are simple in the design of all their components. They thus achieve a peak level of reliability and versatility of use with low manufacturing and installation costs.

Additional features of the invention are apparent from the other claims, the description, and the drawings.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention is explained in detail on the basis of a few example embodiments shown in the drawings. Shown are.

DETAILED DESCRIPTION OF THE PREFERRED EMBODIMENTS

Figure 1:
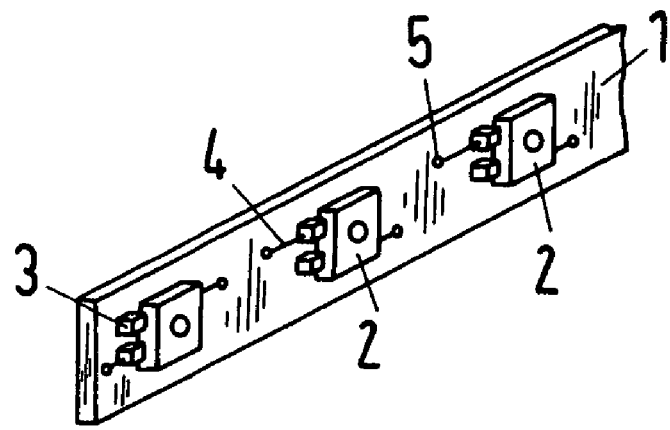
FIG. 1, a perspective view of a lighting source carrier with lighting source applied to one side, FIG. 2, a lighting source carrier that has been bent in several locations, with lighting source applied to both sides, FIG. 3 and FIG. 4, a cross-section through an inventive light, FIG. 5, a perspective view of an embodiment of a housing, FIG. 6, a section through the housing from FIG. 5 with installed lighting source and lighting source carrier, FIG. 7 and FIG. 8, a mirror housing of an exterior rearview mirror with lights installed.

FIG. 1 shows a lighting source carrier 1 with lighting source 2, preferably lighting sources made of LEDs, applied to one side. The lighting source are connected by metal connecting contacts 3 to conductive traces 4 of the lighting source carrier 1 by means of, for example, soldering, welding, Tox joining, or similar customary connecting methods. Said lighting source carrier can take the form of a rigid circuit board or a film. The LEDs 2 are assigned to a fixed position on the lighting source carrier 1 by means of this contacting connection of the LEDs 2 with the lighting source carrier 1. The conductive traces 4 may run on both sides of the lighting source carrier 1, and are connected to one another by means of, for example, connecting elements 5 in the form of feedthroughs. As a result of this design, many electronic components may be arranged on the lighting source carrier 1 in a space-saving manner.

In place of the LEDs, incandescent bulbs or neon tubes may also be used as lighting source 2. The use of electroluminescent films represents a special embodiment. When a film of this nature is used, which produces the light electrochemically between individual layers of the film, there is no longer any need for metallic conductive traces 4 for contacting other electronic components.

Figure 2:
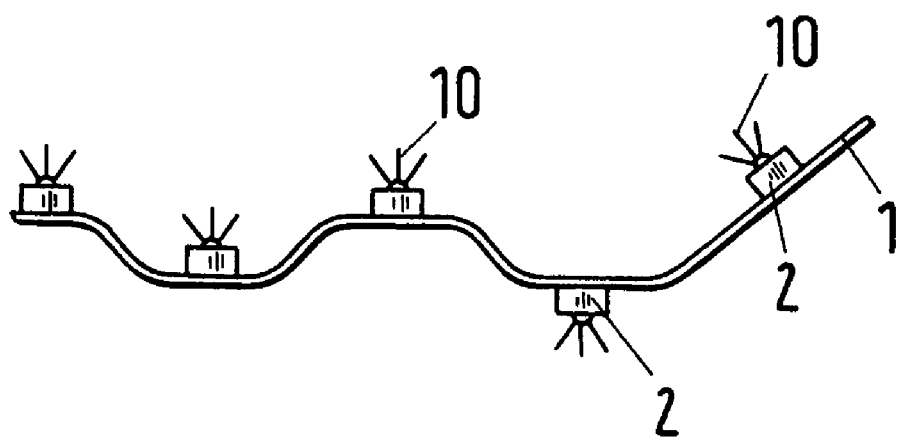

In accordance with the embodiment described under FIG. 1, in the case of double-sided contacting of the lighting source carrier 1, double-sided application of the lighting source 2 is also possible. As is evident from FIG. 2, the lighting source carrier 1 can be bent into a wide variety of shapes. This becomes necessary when the lighting source carrier 1 is built into lights/light units 20 (FIG. 3), and these light units 20 are to be adapted to contours and shapes in the interior spaces of motor vehicles or in the tapered region of a motor vehicle exterior. It is thus possible for these light units 20 to be adaptable to a variety of shapes and contours. Such applications may be, for example, interior lights of a vehicle, reading lights, ambient lights, or even lighting of switching and operating elements.

Figure 3:
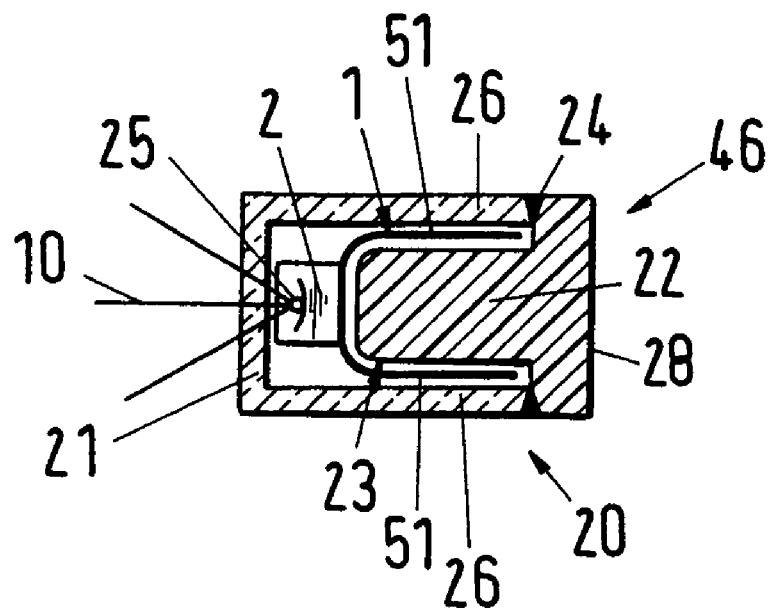

The light unit 20 shown in FIG. 3 is comprised essentially of a U-shaped housing front part 21, which is preferably designed as a transparent lens, and a housing rear wall 22. The U-shaped housing front part 21 advantageously has a uniform wall thickness over its entire extent. The two arms 26 of the U-shaped housing front part 21 are also preferably designed to have symmetrical dimensions. The housing rear wall 22 is inseparably joined to the U-shaped housing front part 21 in the contact region by a weld seam 24 or an adhesive joint 24. A closed, water-tight housing 46 thus results.

The housing rear wall 22 is T-shaped in cross-section, with the width of the base of the T being a multiple of the width of the crosspiece. In the assembled state, the base of the T projects into the housing front part 21, whose arms 26 are attached at their free ends to the crosspiece of the housing rear wall 22. The base of the T serves as a support element 23 for fixing the lighting source 1 in position. The length and thickness of the T base is determined by the installation space required for the lighting source 2 and for the lighting source carrier 1. As shown in FIG. 3, the lighting source carrier 1 is wide enough that its side edges 51 can be wrapped around the T base of the housing rear wall 22. In the assembled state of the light unit 21, the side edges 51 of the lighting source carrier 1 are held in place between the arms 26 of the housing front part 21 and the T base of the housing rear wall 22. The lighting source carrier 1 in the form of a film thus likewise takes on a U-shape. As a result of this conformation, the lighting source 2 and the lighting source carrier 1 are placed and held in a clearly defined position during assembly of the light unit 20.

In the assembled state of the light unit 20, this U-shape and the positioning of the lighting source carrier 1 prevent the lighting source 2 and the lighting source carrier 1 from slipping out of place. This measure also permits reliable and secure assembly of the lighting source carrier 1 in the housing 46. In this context, the side edges 51 of the lighting source carrier 1 and the dimensions of the lighting source carrier 2 [sic] correspond to the associated recesses in the free interior space of the light unit 20 between the arms 26 of the housing front part 21 and the T base of the housing rear wall 22. These design measures and considerations permit economical production and assembly of such light units 20.

Figure 4:
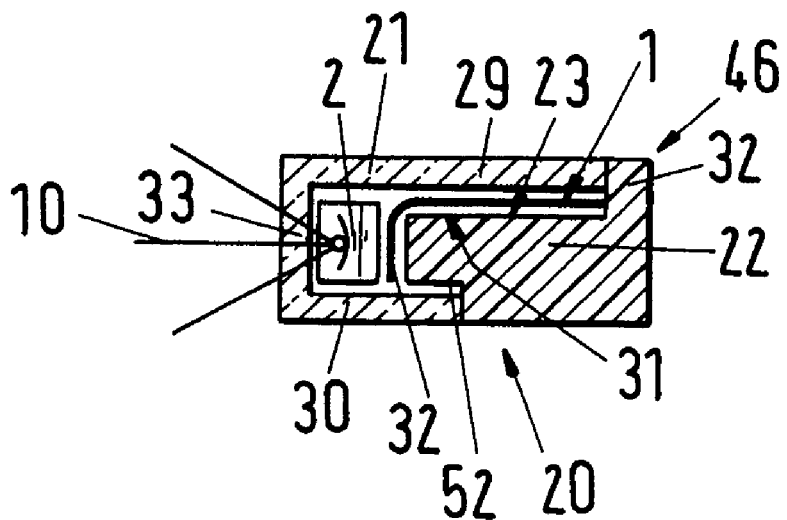

Another very flat embodiment is shown in FIG. 4. Here, the transparent housing front part 21 is U-shaped in design with arms 29 and 30 of different lengths. The lighting source 2, for example an LED, is located on the short arm 32 of the lighting source carrier 1 in the form of a film, which is bent in an L-shape in cross-section. The long arm 31 of the lighting source carrier 1 is parallel to the long arm 29 of the transparent housing front part 21 in the installed state. The crosspiece 33 of the housing front part 21, which is U-shaped in cross-section, corresponds to the entire interior width of the light unit 21, wherein this interior width corresponds essentially to the dimensions of the lighting source 2.

The housing rear wall 22 is designed to be essentially L-shaped in cross-section, wherein the long arm 29 of the housing front part 21 is connected to the end face of the short arm 32 of the housing rear wall 22 in the assembled state of the light unit 20. The short arm 30 of the housing front part 21 projects into a recess 52 of the long arm 31. The two housing parts 21 and 22 are inseparably joined to one another by suitable methods as in FIG. 3. As in the previous example embodiment, the arms 29, 30 of the housing front part 21 and the housing rear wall 22 are designed such that a smooth, continuous outer surface is formed in the area where the two housing parts 21, 22 join.

In the embodiments shown in FIGS. 3 and 4, at least a part of the lighting source carrier 1 in the form of a film can be clamped between a part of the housing rear wall 22 and a part of the transparent housing front part 21 of the housing 46, which prevents oscillation/vibration of the lighting source carrier 1, thus preventing damage to the sensitive conductive traces 4 of the lighting source carrier 1. Separation of the contact points between the lighting source 2 and the conductive traces 4 is also prevented by this means.

The inside clear width of the U-shaped transparent housing front part 21 corresponds essentially to the extent of the lighting source 2 employed. A prerequisite for assembly of this embodiment is that the lighting source carrier 1 in the form of a film is bent or has already been preformed to match the conformation of the housing rear wall 22. This embodiment variation is especially space-saving due to its compact construction, and is thus well suited for installation as, for example, a lighting unit in the vehicle interior, at edges or the like.

It is possible to assemble larger light units by combining similar light units 20 of this nature either arranged side by side and/or one above the other.

Figure 5:
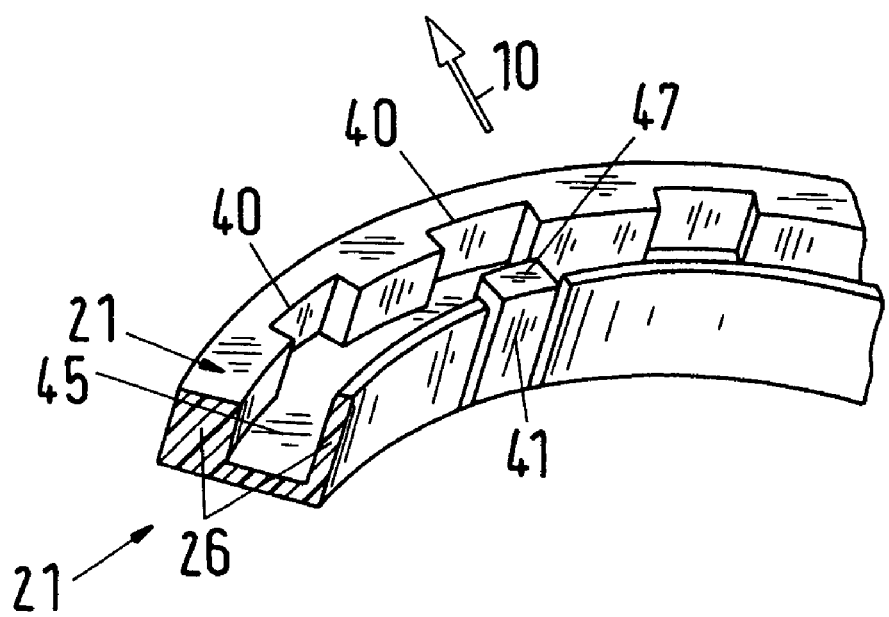

The solution shown in FIG. 5 is suitable for use in curved embodiments of this light unit 20. Here, a portion of a curve-shaped section of a transparent housing part 21 is shown. The basic structure of this housing part 21 likewise represents a U-shaped profile. The light-transmitting outer arm 26 is significantly wider than the inner arm 26. Recesses 40 corresponding to the geometric shape of the lighting source 2 are spaced apart from one another on the inner side of this significantly wider arm 26. The specific application of the light unit 20 determines the number and position of the recesses. For this example embodiment, the lighting source 2, for example LEDs, are advantageously positioned on the lighting source carrier 1 in the form of a film such that in the assembled state each recess 40 is associated with a lighting source 2. Proceeding from the inner side of the light unit 20, the recesses 40 for accommodating the LEDs 2 are shaped such that only small relative motions are possible during the installation of the LEDs 2 in these recesses 40. This is extremely important, since shifting of the LEDs 2 or changes in their position resulting from twisting or displacement of the lighting source carrier 1 in the form of a film would impair the efficiency of the light unit 20. Similarly, vibrations of the lighting source 2 and/or the lighting source carrier 1 during operation can lead to failure of the light unit 20.

Figure 6:
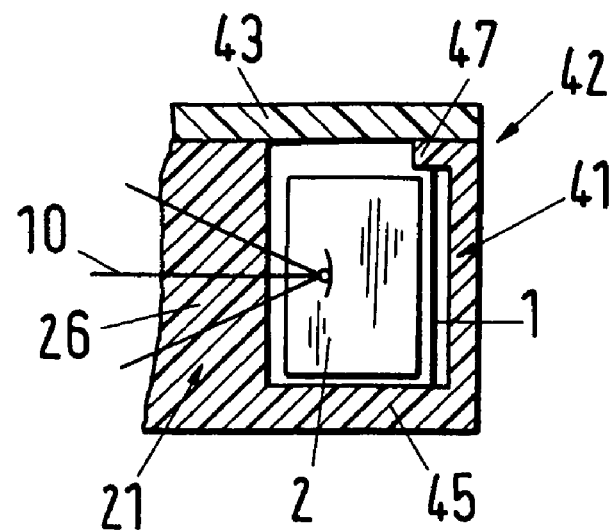

In order to make assembly as simple and reliable as possible here as well, L-shaped retention elements 41 are provided on the outer side of the inner, thin arm 26. They are advantageously designed as a single piece with the arm 26. At the free end, the retention elements 41 are provided with a short arm 47 (FIGS. 5 and 6), which projects toward the outer arm 26. Upon placement of the lighting source carrier 1 in the form of a film, whose width corresponds to the spacing between the overhang 47 of the retention element 41 and the bottom 45 of the housing front part 21, the position of the lighting source carrier 1 in the form of a film is clearly defined, and thus the LEDs 2 are held in place in their predefined position. A cover 43 is placed on the housing front part 21 in order to tightly seal the housing 46 in this case. This cover 43 can also consist of transparent material and be joined to the housing part 21 by adhesive or welding. As is evident from FIG. 6, the arms 26 and the arm 47 of the retention element 41 have end faces lying in a common plane, so that the cover 43 can be reliably and neatly set in place and attached. This embodiment from FIGS. 5 and 6 represents a still more compact light unit 20.

In the example embodiment shown, the recesses 40 embodied as indentations are of equal size and are arranged in a row at intervals from one another. The recesses 40 may also be of different sizes and/or arranged offset from one another in the longitudinal direction of the arm 26, for example.

Advantageously, the recesses 40 extend from the bottom 45 over the height of the arm 26. Depending on the design of the lighting source 2 or the application of the light unit 20, all or only some of the recesses 40 may extend over only a part of the height of the arm 26.

With appropriate thickness of the other arm 26, corresponding recesses may be applied on the inside there, as well.

Figure 7:
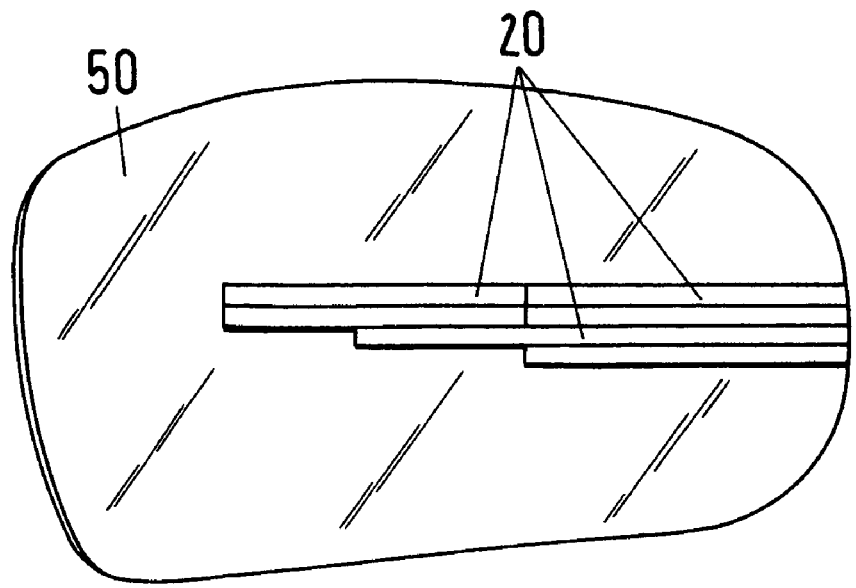

An example application for the light unit 20 from FIGS. 5 and 6 could be the exterior mirror housing 50 of a motor vehicle. Here, only a thin slot corresponding to the height of the light housing 46 would be provided, which in the assembled state would be completely filled by the light unit 20. Retention or sealing of this light unit 20 can be accomplished through gluing, or through the use of suitable seals in the interior region of the mirror housing 50, or through other customary attachment and sealing means. Multiple light units 20 arranged next to one another or lined up, as shown in FIG. 7, are possible here as well.

Figure 8:
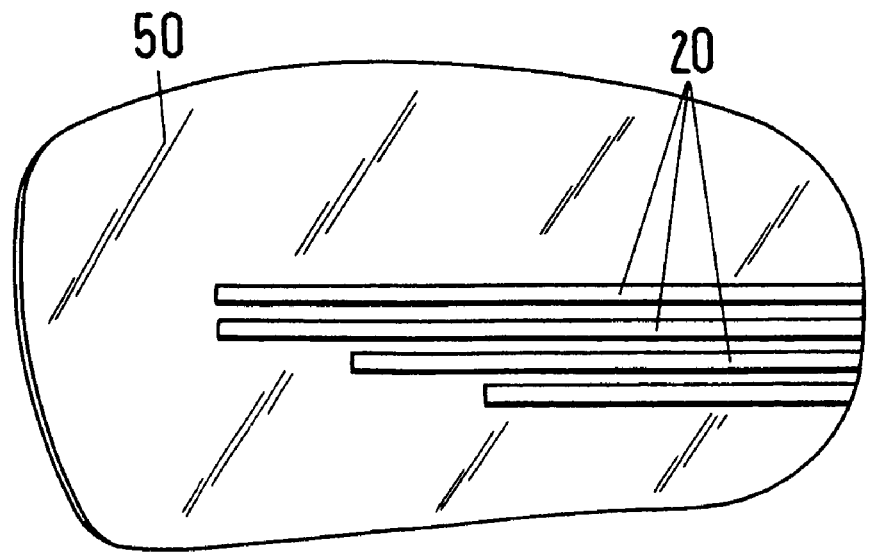

Another example application is apparent from FIG. 8. Here, a plurality of flat light units 20 of this nature are installed parallel to one another at intervals in an exterior mirror housing 50. Due to the narrow, slot-like recesses in the exterior mirror housing 50, the stiffness of said mirror housing 50 is reduced less than with recesses for the light inserts in customary use today.

As a result of the ease of manufacturing these light units 20, especially economical embodiments of lighting devices are possible. The small dimensions of such light units 20 make it possible to combine multiple light units 20 with relatively small installation space and minimal costs for materials and production.

On account of the use of few components, and the simple design implementation of the housing parts, automated assembly of the light units 20 is possible.

In accordance with designs that are customary today, light units 20 of this nature can of course be made of pigmented materials.

Likewise, optics applied to the inside as well as to the outside region of the light unit 20 are also possible. The housing components 21 and 22 of such light units 20 can be made of rigid plastics, preferably of polymethylmethacrylate (PMMA) or plastics of this family. The rear housing part 22, such as in FIGS. 3 and 4 for example, can of course also be made of another plastic, such as, for example, polycarbonate (PC), polybutylene terephthalate (PBT), or the like.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A light for a vehicle comprising:
    at least one light source;
    a light source carrier for operably holding said at least one light source;
    a transparent housing having at least a front part, a housing rear wall, and indentations provided in an inner side of said transparent housing front part for receiving and holding said light source carrier; and
    a mirror housing having an opening wherein said transparent housing at least partially fills said opening of said mirror housing, wherein the conformation of said light source carrier corresponds at least in part to the inside contour of said transparent housing, wherein the lighting source carrier is a flexible conductive film.

2. Light according to claim 1, wherein the inside contour of the said at least a front part of said transparent housing is a U-shape in cross-section.

3. Light according to claim 1, wherein the inside contour of said housing rear wall is L-shaped in cross-section.

4. Light according to claim 1, wherein the inside contour of said at least a front part of said transparent housing is curved in design, at least in sections.

5. Light according to claim 1, wherein the lighting source carrier is in contact with the inside of the housing rear wall, at least in sections.

6. Light according to claim 1, wherein the lighting source carrier is, at least in sections, immovably clamped between the housing front part and the housing rear wall.

7. Light according to claim 1, wherein at least a part of the housing front part constitutes the lens of the light.

8. Light according to claim 1, wherein the housing front part has, in cross-section, the shape of a U with arms of equal or unequal length.

9. Light according to claim 1, wherein the housing of the light unit is closed.

10. Light according to claim 1, wherein the lighting source is an LED.

11. Light according to claim 1, wherein the lighting source is an incandescent lamp.

12. Light according to claim 1, wherein the lighting source is an electroluminescent film and has the same profile as the lighting source carrier.

13. Light according to claim 1, wherein the indentations are provided in the inner side of at least one arm of said at least a front part of said transparent housing.

14. Light according to claim 1, wherein the indentations are distributed over the length of said at least a front part of said transparent housing.

15. Light according to claim 1, wherein the lighting source is positioned to be immovable in the indentations.

16. Light according to claim 1, wherein the lighting source carrier is secured in place in its mounting position in the housing by at least one retention element.

17. Light according to claim 16, wherein the retention element is provided on said at least a front part of said transparent housing, as a single piece therewith.

18. Light according to claim 16, wherein the retention element has a projection protruding into the installation space for the lighting source carrier.

19. Light according to claim 18, wherein the projection engages over the lighting source carrier.

20. Light according to claim 1, wherein a plurality of lighting sources are arranged on one side of the conductive film.

21. Light according to claim 1, wherein a plurality of lighting sources are arranged on both sides of the conductive film.

22. A light source for vehicles, said light source comprising:
- at least one light source;
- a light source carrier for operably holding said at least one light source wherein the light source is an electroluminescent film;
- a light source carrier for operably holding said at least one light source, wherein said electroluminescent film of said light source has the same profile as the light source carrier;
- a transparent housing having at least a front part, a housing rear wall, and indentations provided in the an inner side of said housing front part for receiving and holding said light source carrier; and
- a mirror housing having an opening wherein said transparent housing at least partially fills said opening of said mirror housing, wherein the conformation of said light source carrier corresponds at least in part to the inside contour of said transparent housing.

23. Light according to claim 22, wherein the inside contour of the said at least a front part of said transparent housing is a U-shape in cross-section.

24. Light according to claim 22, wherein the inside contour of said housing rear wall is L-shaped in cross-section.

25. Light according to claim 22, wherein the inside contour of said at least a front part of said transparent housing is curved in design, at least in sections.

26. Light according to claim 22, wherein the lighting source carrier is in contact with the inside of the housing rear wall, at least in sections.

27. Light according to claim 22, wherein the lighting source carrier is, at least in sections, immovably clamped between the housing front part and the housing rear wall.

28. Light according to claim 22, wherein at least a part of the housing front part constitutes the lens of the light.

29. Light according to claim 22, wherein the housing front part has, in cross-section, the shape of a U with arms of equal or unequal length.

30. Light according to claim 22, wherein said transparent housing of the light unit is closed.

31. Light according to claim 22, wherein recesses are provided in said transparent housing for the lighting source.

32. Light according to claim 22, wherein the recesses are indentations in the inner side of said at least a front part of said transparent housing.

33. Light according to claim 22, wherein the indentations are provided in the inner side of at least one arm of said at least a front part of said transparent housing.

34. Light according to claim 22, wherein the indentations are distributed over the length of said at least a front part of said transparent housing.

35. Light according to claim 22, wherein the lighting source is positioned to be immovable in the indentations.

36. Light according to claim 22, wherein the retention element has a projection protruding into the installation space for the lighting source carrier.

37. Light according to claim 28, wherein the projection engages over the lighting source carrier.

38. Light according to claim 22, wherein the lighting source carrier is a flexible conductive film.

39. Light according to claim 38, wherein a plurality of lighting sources are arranged on one side of the conductive film.

40. Light according to claim 38, wherein a plurality of lighting sources are arranged on both sides of the conductive film.

* * * * *